United States Patent
Huang

(10) Patent No.: US 9,019,432 B2
(45) Date of Patent: Apr. 28, 2015

(54) VIDEO/AUDIO PLAYING METHOD AND TELEVISION THEREOF

(71) Applicant: MStar Semiconductor, Inc., Hsinchu Hsien (TW)

(72) Inventor: Hung-Chi Huang, Hsinchu County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/262,924

(22) Filed: Apr. 28, 2014

(65) Prior Publication Data

US 2014/0327826 A1    Nov. 6, 2014

(30) Foreign Application Priority Data

May 2, 2013    (TW) .............................. 102115777 A

(51) Int. Cl.
| | | |
|---|---|---|
| *H04N 7/08* | (2006.01) | |
| *H04B 1/38* | (2006.01) | |
| *H04W 4/00* | (2009.01) | |
| *H04N 5/60* | (2006.01) | |
| *H04N 5/04* | (2006.01) | |
| *H04N 21/41* | (2011.01) | |
| *H04N 21/4363* | (2011.01) | |
| *H04N 21/81* | (2011.01) | |
| *H04N 21/442* | (2011.01) | |

(52) U.S. Cl.
CPC ................. *H04N 5/607* (2013.01); *H04N 5/04* (2013.01); *H04N 21/4126* (2013.01); *H04N 21/43637* (2013.01); *H04N 21/8106* (2013.01); *H04N 21/44227* (2013.01)

(58) Field of Classification Search
CPC ................... H04N 21/43637; H04N 21/8106; H04N 21/44227; H04N 21/4126; H04N 5/04; H04N 5/607
USPC .......... 348/739, 738, 569, 552; 381/300, 303, 381/306, 307, 58, 59, 79, 96; 455/41.2, 455/41.3
See application file for complete search history.

(56) References Cited

U.S. PATENT DOCUMENTS

| | | | | |
|---|---|---|---|---|
| 5,182,552 | A  * | 1/1993 | Paynting ...................... | 340/4.42 |
| 7,254,367 | B2 * | 8/2007 | Helden et al. ................ | 455/41.2 |
| 7,997,494 | B2 * | 8/2011 | Duncan ..................... | 235/472.01 |
| 2005/0195986 | A1* | 9/2005 | McCarty et al. ................ | 381/79 |
| 2007/0067801 | A1* | 3/2007 | Monta et al. ..................... | 725/44 |
| 2007/0220561 | A1* | 9/2007 | Girardeau et al. ............. | 725/80 |
| 2008/0039017 | A1* | 2/2008 | Kim ............................. | 455/41.2 |
| 2008/0301580 | A1* | 12/2008 | Hjelmeland Alams et al. ............................ | 715/808 |
| 2009/0175216 | A1* | 7/2009 | Bozarth et al. ................ | 370/328 |
| 2009/0233582 | A1* | 9/2009 | Suzuki et al. ............... | 455/414.1 |
| 2010/0142723 | A1* | 6/2010 | Bucklen .......................... | 381/81 |
| 2012/0128172 | A1* | 5/2012 | Alden ............................. | 381/77 |
| 2012/0289155 | A1* | 11/2012 | Dua ............................ | 455/41.1 |
| 2013/0346642 | A1* | 12/2013 | Millen .......................... | 710/20 |
| 2014/0057569 | A1* | 2/2014 | Toivanen et al. ............. | 455/41.3 |
| 2014/0119561 | A1* | 5/2014 | Banks et al. ................... | 381/80 |
| 2014/0146192 | A1* | 5/2014 | Zhou et al. ................. | 348/211.2 |

* cited by examiner

*Primary Examiner* — Victor Kostak
(74) *Attorney, Agent, or Firm* — WPAT, PC; Justin King

(57) ABSTRACT

After a television transmits an audio signal, which is generated by decoding an audio stream, to a mobile electronic device located within a detectable range of the television in a wireless manner, the mobile electronic device plays the audio signal received from the television for fulfilling surround sound performance.

14 Claims, 2 Drawing Sheets

VIDEO/AUDIO PLAYING METHOD AND TELEVISION THEREOF

CROSS REFERENCE TO RELATED APPLICATIONS

This application claims priority under 35 U.S.C 119 to Taiwan patent application, TW102115777, filed on May 2, 2013, the disclosure of which is incorporated herein by reference.

BACKGROUND OF THE INVENTION

1. Field of the Invention

The present invention relates to a video/audio playing method and television, and more particularly, to a video/audio playing method fulfilling surround sound effect by transmitting audio signal from a television to a mobile electronic apparatus and the television applying the video/audio playing method.

2. Description of the Prior Art

Decades after televisions went into families, requirements to video/audio quality of televisions gradually upgrade to evolve the home theater concept. A home theater is realized by additional equipments other than television, creating surround sound effect as in the movie theater. The equipment providing surround sound effect is physically connected to the television for receiving the audio signal generated by the television.

In additional to inherent high cost, since the equipment creating surround sound effect is required to physically connect to the television, the difficulty of installation has to be considered. Besides, the surround sound effect provided by the equipment is easily downgraded and affected by the location constraints of television and the equipment. Gain may not be worth the cost.

SUMMARY OF THE INVENTION

For solving the shortcomings of high cost or difficulty of installation of surround sound effect equipment mentioned in the prior art, a video/audio playing method and a television applying the method are disclosed in this present invention.

The video/audio playing method disclosed by the present invention is applicable to a television having a signal transmission range. The method comprises: transmitting an acknowledgement signal if there exists a mobile electronic apparatus in the signal transmission range; and transmitting an audio signal to the mobile electronic apparatus in response to receiving an approved signal returned from the mobile electronic apparatus corresponding to the acknowledgement signal such that the mobile electronic apparatus plays synchronically audio content of the audio signal.

The television having a signal transmission range disclosed by the present invention comprises a detecting module and a wireless audio transmitter. The detecting module is configured for transmitting an acknowledgement signal if there exists a mobile electronic apparatus in the signal transmission range and receiving an approved signal returned from the mobile electronic apparatus corresponding to the acknowledgement signal. The wireless audio transmitter is configured for transmitting an audio signal to the mobile electronic apparatus in response to receiving the approved signal such that the mobile electronic apparatus plays synchronically audio content of the audio signal.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
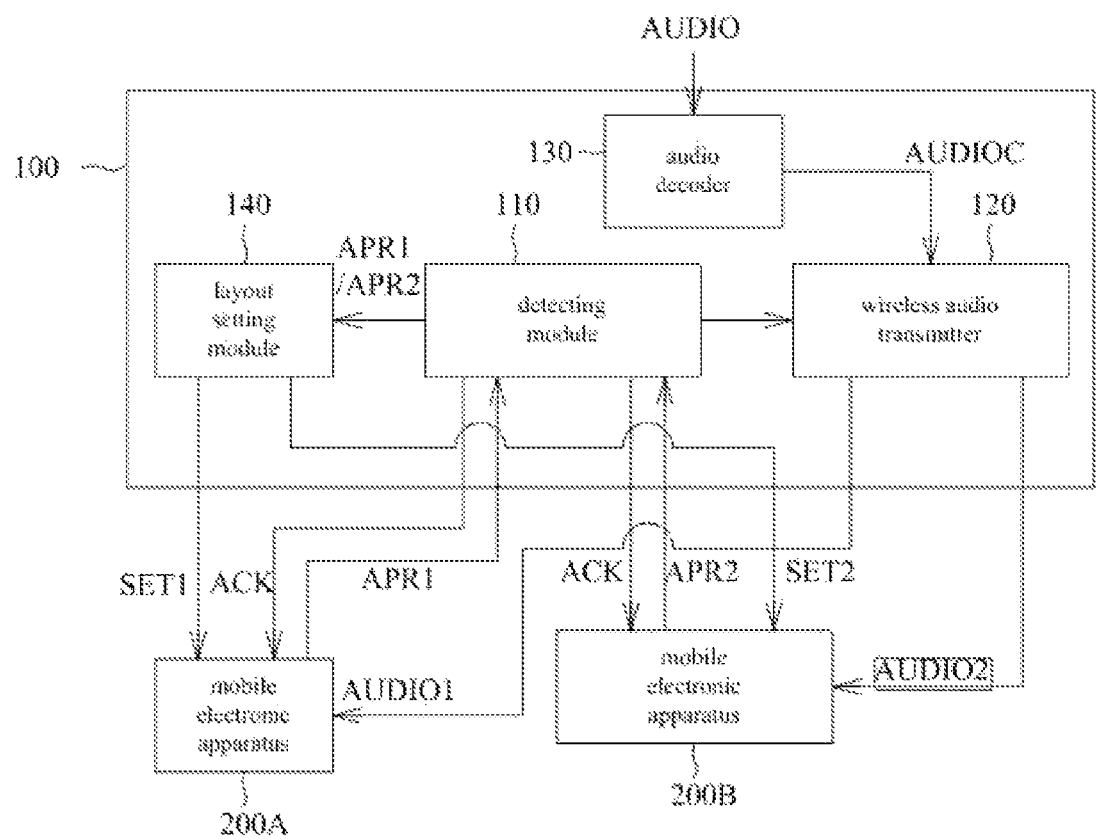
FIG. 1 is a schematic block diagram of interaction between a television and several mobile electronic apparatus for fulfilling surround sound effect in accordance with an embodiment of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Please refer to FIG. 1, which shows a schematic block diagram of interaction between a television 100 and several mobile electronic apparatuses 200A and 200B for fulfilling surround sound effect in accordance with an embodiment of the present invention. As shown in FIG. 1, the television 100 comprises a detecting module 110, a wireless audio transmitter 120, and an audio decoder 130. The television 100 may be a digital television.

The detecting module 110 is configured to detect the existence of mobile electronic apparatus neighboring to the television 100. In the embodiment shown in FIG. 1, both of the mobile electronic apparatuses 200A and 200B are located in a signal transmission range of the detecting module 110. The television is aware of the existences of the mobile electronic apparatus 200A and 200B according to the detection performed by the detecting module 110.

The audio decoder 130 is configured to decode audio signal stream AUDIO received by the television 100 from external network or physical cable wires according to different channels in order to generate decoded channel audio stream AUDIOC. The decoded channel audio stream AUDIOC generated by the audio decoder 130 is organized as a data structure such that audio streams belonging to different channels can be directly and separately accessed.

The wireless audio transmitter 120 is configured to follow the instructions of the detecting module 110 in order to convert an audio stream corresponding to a specified channel to an audio signal and to wirelessly transmit the audio signal to a specified mobile electronic apparatus. For example, transmitting via Wi-Fi network or wireless Internet.

The practice of the television 100 realizing surround sound effect is elaborated in details below.

At first, the detecting module 110 can actively detect or be passively inquiried to detect the mobile electronic apparatuses 200A and 200B are located within the signal transmission range. After the apparatuses detected, the detecting module 110 broadcasts an acknowledgement signal ACK. After the mobile electronic apparatuses 200A and 200B receive the acknowledgement signal ACK, in case the user of the mobile electronic apparatus 200A and 200B intends to accept the acknowledgment and trigger acceptance commands on the mobile electronic apparatuses 200A and 200B, the mobile electronic apparatus 200A returns an approved signal APR1 and the mobile electronic apparatus 200B returns another approved signal APR2. The approved signal APR1 includes the identity of the mobile electronic apparatus 200A and/or a channel number specified by the mobile electronic apparatus 200A. Similarly, the approved signal APR2 includes the identity of the mobile electronic apparatus 200B and/or a channel number specified by the mobile electronic apparatus 200B.

In response to the receiving of the approved signals APR1 and APR2 from the mobile electronic apparatuses 200A and 200B, respectively, the detecting module 110 forwards the approved signals APR1 and APR2 to the wireless audio transmitter 120. After parsing the approved signal APR1 and retrieving the identity of the mobile electronic apparatus 200A and the specified channel number, the wireless audio transmitter 120 retrieves an audio stream from the decoded channel audio stream AUDIOC according to the specified channel number in order to generate an audio signal AUDIO1. At last, the wireless transmitter 120 transmits wirelessly the audio signal AUDIO1 as well as the identity of the mobile electronic apparatus 200A such that only the mobile electronic apparatus 200A is able to receive and play the audio signal AUDIO1. In a similar way, after parsing the approved signal APR2 and retrieving the identity of the mobile electronic apparatus 200B and the specified channel number, the wireless audio transmitter 120 retrieves an audio stream from the decoded channel audio stream AUDIOC according to the specified channel number in order to generate an audio signal AUDIO2. At last, the wireless transmitter 120 transmits wirelessly the audio signal AUDIO2 as well as the identity of the mobile electronic apparatus 200B such that only the mobile electronic apparatus 200B is able to receive and play the audio signal AUDIO2.

Because the mobile electronic apparatus is always carried by the user or located within a reachable range of the user, when the television is playing video image, the audio stream of the channel corresponding to the video image being played is wirelessly transmitted to each of the mobile electronic apparatuses. Hence, the user of the mobile electronic apparatus can listen to the audio with less loss. If each of the mobile electronic apparatus in the signal transmission range of the television 100 specifies the same channel number, surround sound effect is realized without additional equipment. Therefore the cost of equipment providing surround sound effect can be saved.

In one embodiment of the present invention, the mobile electronic apparatus 200A can further specify a sound channel, e.g., left sound channel, to the wireless audio transmitter 120. Consequently, the audio signal AUDIO1 contains only left sound channel data of the specified channel. Similarly, the mobile electronic apparatus 200B can further specify another sound channel, e.g., right sound channel, to the wireless audio transmitter 120. Consequently, the audio signal AUDIO2 contains only right sound channel data of the specified channel. If properly arranged, the audio transducers of the television 100 and the mobile electronic apparatuses 200A and 200B can provide collectively surround sound effect. In another embodiment, the television 100 can automatically appoints that the audio signal AUDIO1 contains one sound channel of the specified channel and the audio signal AUDIO2 contains another sound channel of the specified channel. In an alternative embodiment, the audio sound channel AUDIO1 played by the mobile electronic apparatus 200A and the audio sound channel AUDIO2 played by the mobile electronic apparatus 200B can contain multiple and duplicated sound channels, respectively. In practical, if the audio stream of the channel corresponding to the video image supports multiple sound channels, e.g., 5.1 surround sound, the television 100 can synchronically play sound channels other than those played by the mobile electronic apparatuses 200A and 200B. Reversely, if the audio stream of the channel corresponding to the video image being playing supports two or single sound channel, the television can play all of sound channels synchronically. The configuration can be set manually by user or automatically by the television 100 and/or the mobile electronic apparatuses 200A and 200B. Moreover, in order to support better surround sound effect, the television 100 can further comprise other external audio transducer equipment and it is not restricted to the mobile electronic apparatuses 200A and 200B.

In one embodiment of the present invention, the television 100 may further include a layout setting module 140, which stores a plurality of surround sound layout settings generated according to a rule of thumb of surround sound effect in advanced. When the detecting module 110 receives the approved signals APR1 and APR2 from the mobile electronic apparatuses 200A and 200B, respectively, and forwards them to the layout setting module 140, the layout setting module 140 indicates best deployment positions of the mobile electronic apparatuses 200A and 200B for improving the surround sound effect according to the position information of the mobile electronic apparatuses 200A and 200B contained in the approved signals APR1 and APR2, respectively. The layout setting module 140 generates and transmits position setting signals SET1 and SET2 to the mobile electronic apparatuses 200A and 200B (with the help of the identities of the mobile electronic apparatuses 200A and 200B), respectively, in order to indicates the best deployment positions. Please be advised that when the detecting module 110 transmits the acknowledgement signal ACK, it is requested that the position information of responded mobile electronic apparatus should be contained in the approved signal.

Figure 2:
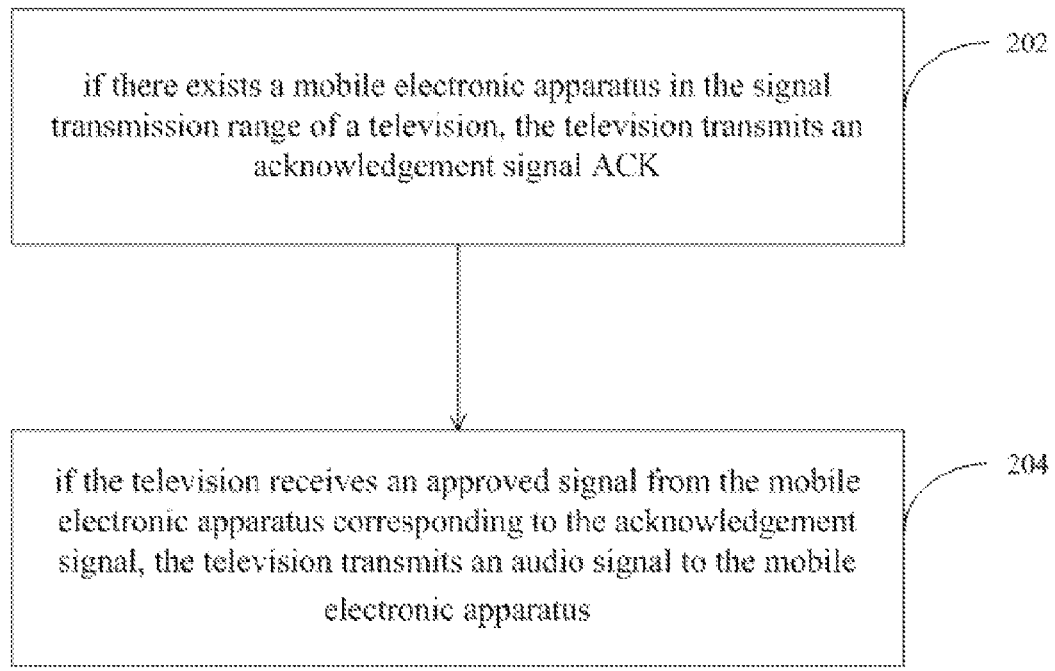
FIG. 2 is a flowchart diagram of a video/audio playing method disclosed in an embodiment of the present invention.

Please refer to FIG. 2, which illustrates a flowchart of a video/audio playing method disclosed in an embodiment of the present invention. As shown in FIG. 2, the method includes the following steps:

Step 202: if there exists a mobile electronic apparatus in the signal transmission range of a television 100, the television 100 transmits an acknowledgement signal ACK.

Step 204: if the television 100 receives an approved signal APR1 or APR2 from the mobile electronic apparatus corresponding to the acknowledgement signal ACK, the television 100 transmits an audio signal AUDIO1 or AUDIO2 to the mobile electronic apparatus.

The details of the flowchart as shown in FIG. 2 are already elaborated in the paragraphs with respect to FIG. 1, and are thus omitted herein. However, any implementations embody reasonable permutations of the steps shown in FIG. 2 with mentioned limitations should be taken as embodiments of the present invention.

A video/audio playing method and a television applying the video/audio playing method are disclosed by the present invention. By directly transmitting audio signal to mobile electronic apparatus for playing, user can enjoy surround sound effect without paying high cost of surround sound effect equipment. In some embodiments of the present invention, deployment position of the mobile electronic apparatus with respect to the television can be directly instructed in order to achieve best surround sound effect.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A video/audio playing method, applicable to a television having a signal transmission range, the method comprising:
   transmitting an acknowledgement signal if a mobile electronic apparatus is within the signal transmission range;
   transmitting an audio signal to the mobile electronic apparatus in response to receiving an approved signal returned from the mobile electronic apparatus corresponding to the acknowledgement signal such that the mobile electronic apparatus synchronically plays audio content of the audio signal; and
   transmitting a layout setting signal indicating a deployment position of the mobile electronic apparatus in response to receiving the approved signal.

2. The method of claim 1, wherein signal transmissions between the television and the mobile electronic apparatus is achieved by Wi-Fi network or wireless Internet.

3. The method of claim 1, wherein the audio signal comprises audio content of at least one channel played by the television.

4. The method of claim 1, further comprising:
   receiving and decoding an audio signal stream in order to generate a decoded channel audio stream, which comprises a plurality of audio streams corresponding to a plurality of channel numbers, respectively.

5. The method of claim 4, wherein receiving the approved signal returned from the mobile electronic apparatus further comprising:
   retrieving an audio stream from the plurality of audio streams corresponding to the channel number specified by the mobile electronic apparatus contained in the approved signal and generating the audio signal according to the audio stream.

6. The method of claim 5, wherein the audio signal comprises a sound channel of the audio stream corresponding to the specified channel number.

7. The method of claim 1, wherein the approved signal comprises an identity of said mobile electronic apparatus.

8. A television having a signal transmission range, comprising:
   a detecting module, configured to transmit an acknowledgement signal when a mobile electronic apparatus is within the signal transmission range and receiving an approved signal returned from the mobile electronic apparatus corresponding to the acknowledgement signal;
   a wireless audio transmitter, configured to transmit an audio signal to the mobile electronic apparatus in response to receiving the approved signal such that the mobile electronic apparatus synchronically plays audio content of the audio signal; and
   a layout setting module, configured for transmitting a layout setting signal indicating a deployment position of the mobile electronic apparatus in response to the detecting module receiving the approved signal.

9. The television of claim 8, wherein signal transmissions between the television and the mobile electronic apparatus is achieved by Wi-Fi network or wireless Internet.

10. The television of claim 8, the audio signal comprises the audio content of at least one channel played by the television.

11. The television of claim 8, further comprising:
   an audio decoder, configured for receiving and decoding an audio signal stream in order to generate a decoded channel audio stream, which comprises a plurality of audio streams corresponding to a plurality of channel numbers, respectively.

12. The television of claim 11, wherein when the television receiving the approved signal returned from the mobile electronic apparatus, the wireless audio transmitter is further configured to retrieve an audio stream from the plurality of audio streams corresponding to the channel number specified by the mobile electronic apparatus contained in the approved signal and generating the audio signal according to the audio stream.

13. The television of claim 12, wherein the audio signal comprises a sound channel of the audio stream corresponding to the specified channel number.

14. The television of claim 8, wherein said approved signal comprises an identity of said mobile electronic apparatus.

* * * * *